United States Patent [19]
Gennari et al.

[11] Patent Number: 5,996,433
[45] Date of Patent: Dec. 7, 1999

[54] SYSTEM FOR ACTUATING THE UNLOADING MAT IN SWITCHING MACHINES

[75] Inventors: Nedo Gennari, Genova; Andrea Faure, Genova Sampierdarena, both of Italy

[73] Assignee: Finmeccanica S.p.A., Rome, Italy

[21] Appl. No.: 09/064,153

[22] Filed: Apr. 22, 1998

[30] Foreign Application Priority Data

May 14, 1997 [IT] Italy .................................. MI97A1123

[51] Int. Cl.$^6$ ............................ B65G 47/52; F16H 29/20
[52] U.S. Cl. ....................... 74/89.17; 74/422; 198/370.06
[58] Field of Search ................................... 74/89.17, 422; 198/370.03, 370.06, 370.1

[56] References Cited

U.S. PATENT DOCUMENTS

| | | | |
|---|---|---|---|
| 3,618,745 | 11/1971 | Dominici | 198/370.05 |
| 4,995,502 | 2/1991 | Kitamura | 198/346.1 |
| 5,372,235 | 12/1994 | Gennari et al. | 198/890.1 |
| 5,387,260 | 2/1995 | Gennari et al. | 198/798 |

FOREIGN PATENT DOCUMENTS 0 752 280  1/1997  European Pat. Off. .

*Primary Examiner*—Allan D. Herrmann
*Attorney, Agent, or Firm*—Young & Thompson

[57] ABSTRACT

A device for actuating the unloading mat in switching machines of a type comprising elements capable of engaging a supporting roller for the mat, so as to control its rotation and effect the unloading of the transported object during the forward motion of the trolley holding the mat. The elements include a rack capable of engaging a sprocket solidly affixed to the shaft of one of the mat rollers, and the rack is mounted on a support subjected to the action of eccentric devices designed to govern the shifts from a position of rest to one of engaging with the sprocket. The rack is mounted on the support with the capability of performing small shifts against elastic devices, along a direction parallel to the direction of the trolley's forward motion.

6 Claims, 5 Drawing Sheets

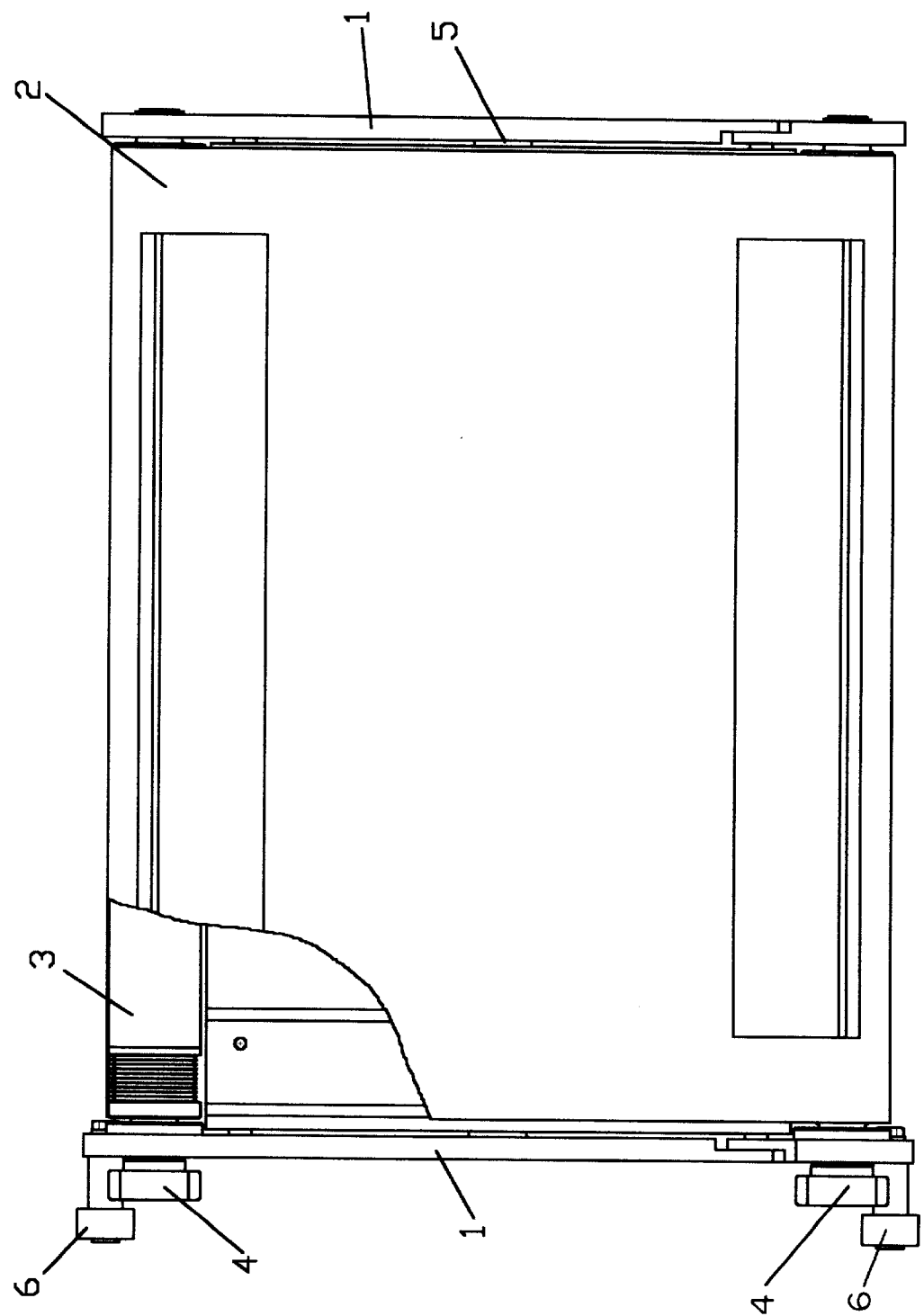

SYSTEM FOR ACTUATING THE UNLOADING MAT IN SWITCHING MACHINES

FIELD OF THE INVENTION

This invention relates to a system for actuating the unloading mat in switching machines of a type comprising a number of trolleys moving along a fixed path, each equipped with a rotating mat constituting the carrying plane for the object to be switched.

The invention regards the actuating devices for this mat, which is rotated when the trolley passes pre-established collecting devices to which it unloads the carried objects, based on a coding assigned at the moment of loading the machine.

According to the invention this actuating system comprises a rack mounted on a support shifted to engage the rack with a sprocket mounted on one of the rollers on which the mat is installed, so as to rotate it and unload the object.

According to a preferred aspect of the invention, this rack is mounted on said support with the possibility of performing small shifting motions opposed by elastic means, so as to favour a better engagement between the sprocket mounted on the trolley and the rack itself.

BACKGROUND OF THE INVENTION

The known switching equipment comprises a number of mobile trolleys moving along a fixed path, pulled for example by chains or the like, each fitted with a rotating mat which simultaneously constitutes a carrying plane for the objects to be transported, and a device designed to unload it when passing certain pre-established collecting points.

This equipment is generally controlled by a computer and coupled to certain coding devices which assign to each of the objects, at the time of their loading on the machine, a certain trolley and exit gate and subsequently govern the actuation of the mat when it passes opposite the exit assigned to the loaded object.

Depending on the type of equipment and the user's requirements, the unloading mat may be actuated by motor devices mounted on the trolleys, each connected and coupled to an individual mat, or by mechanical means arranged along the path, so as to engage mechanical mat controlling devices installed on each trolley.

For example, one of these devices is described in the Italian patent No. 1.254.117 by the same applicant, to which reference is made for further details relating to this type of equipment.

As mentioned above, the means controlling the rotation of the mat may be of various kinds, for example devices fitted with cams that engage certain elements attached to the mat to control its rotation, or various mechanical devices engaging the sprockets, rollers or similar elements affixed to the shaft of one of the rollers holding the mat.

SUMMARY OF THE INVENTION

The present invention relates to this field, and proposes an actuating system for this unloading mat in a switching machine, having a compact design and a precise and reliable operation.

In particular, this is a mechanical device capable of acting on the shaft of one of the rollers of the mat, and which is in turn actuated by an electromagnet.

This achieves a silently operating device of limited size, easily governed by the electronics of the machine.

BRIEF DESCRIPTION OF THE DRAWINGS

This invention will now be described in detail, as a non-limiting example with reference to the attached drawings, in which:

FIG. 1 is a partially sectioned plan view of a trolley fitted with a mat controlled by the devices according to the invention;

DETAILED DESCRIPTION OF THE INVENTION

With reference to the FIG. 1, no. 1 identifies the frame of one of the trolleys of a switching machine, provided with a rotating mat 2 which constitutes the carrying and unloading plane of the objects.

The mat is mounted on a pair of rollers 3, and the shaft of at least one of these rollers shafts carries a keyed-on gear 4.

Figure 3:
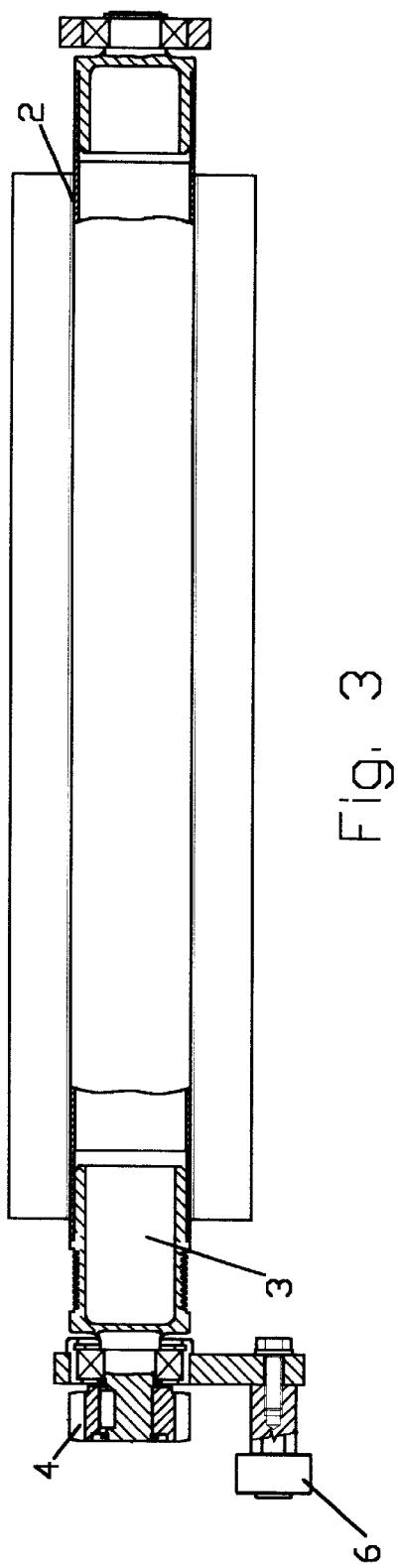
FIG. 3 is a partially sectioned view of the trolley in part 1, along a plane orthogonal with respect to the previous figure.
Figure 2:
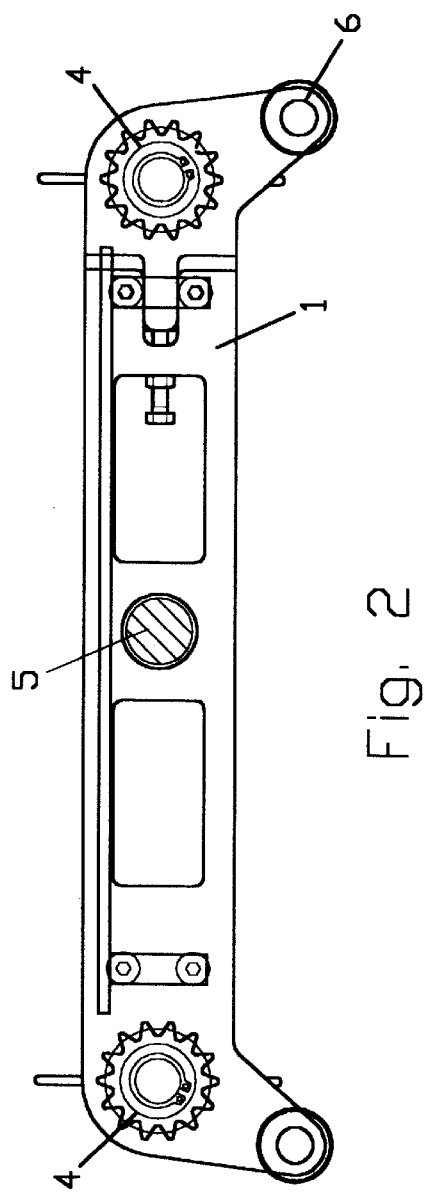
FIG. 2 is a side view of the trolley in FIG. 1.

The frame 1 is hinged to a shaft 5 (visible only in the sectional view of FIG. 2) whose ends are attached to a pair of pulling chains, belts or the like which move the trolleys along their path.

Free-wheeling rollers 6, mounted on frame 1, are guided on rails or the like along their path, so as to bring the trolley and thus the plane of the mat to the desired sloping angle.

At the time of loading the object on the machine, the controlling electronics assigns the object a certain trolley and actuates, when the latter passes opposite the collecting devices corresponding to the expected point of destination, the unloading devices governing the mat's rotation to unload the object.

Figure 4:
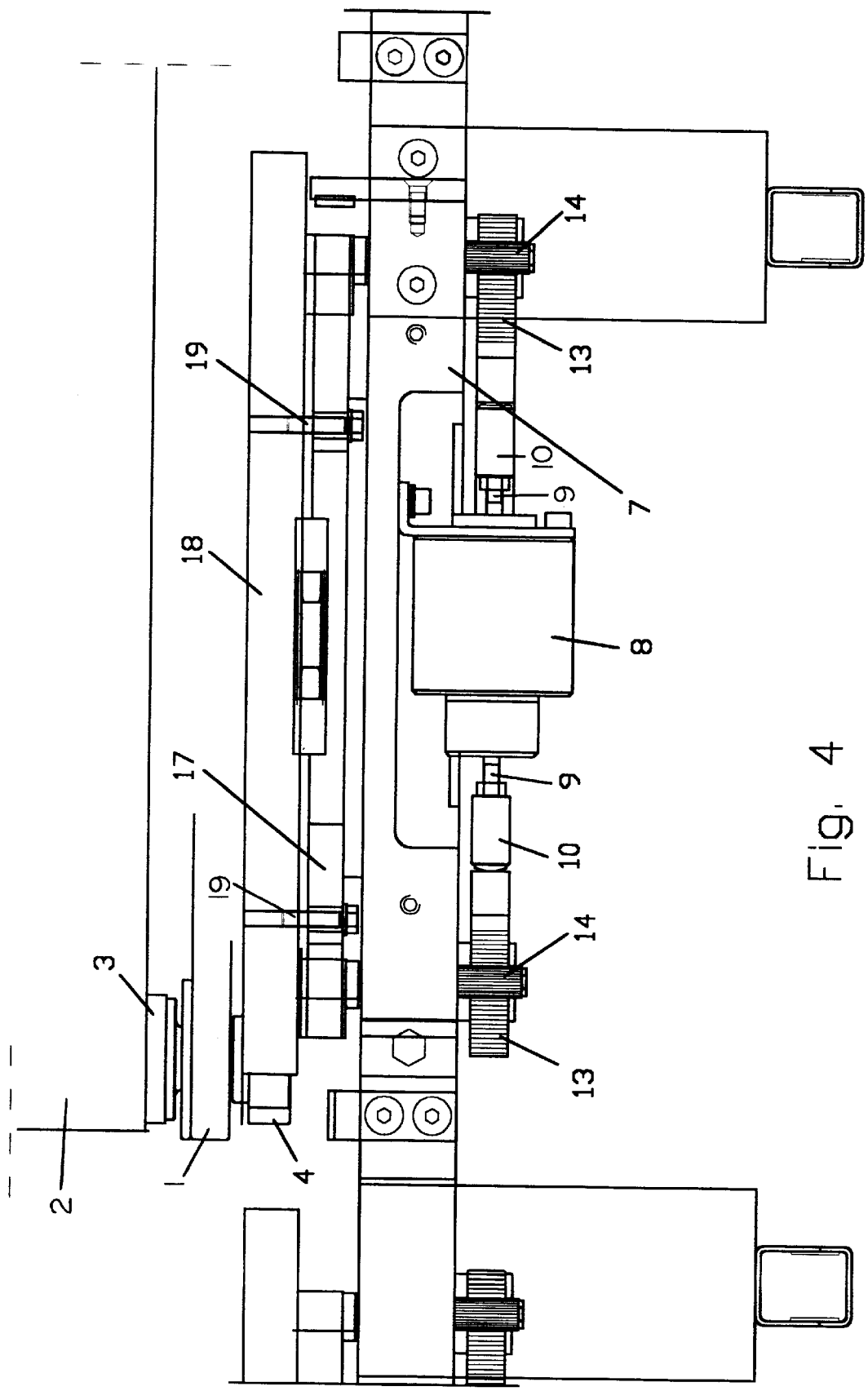
FIG. 4 is a top view of the actuating devices for the unloading motion, according to the invention.
Figure 5:
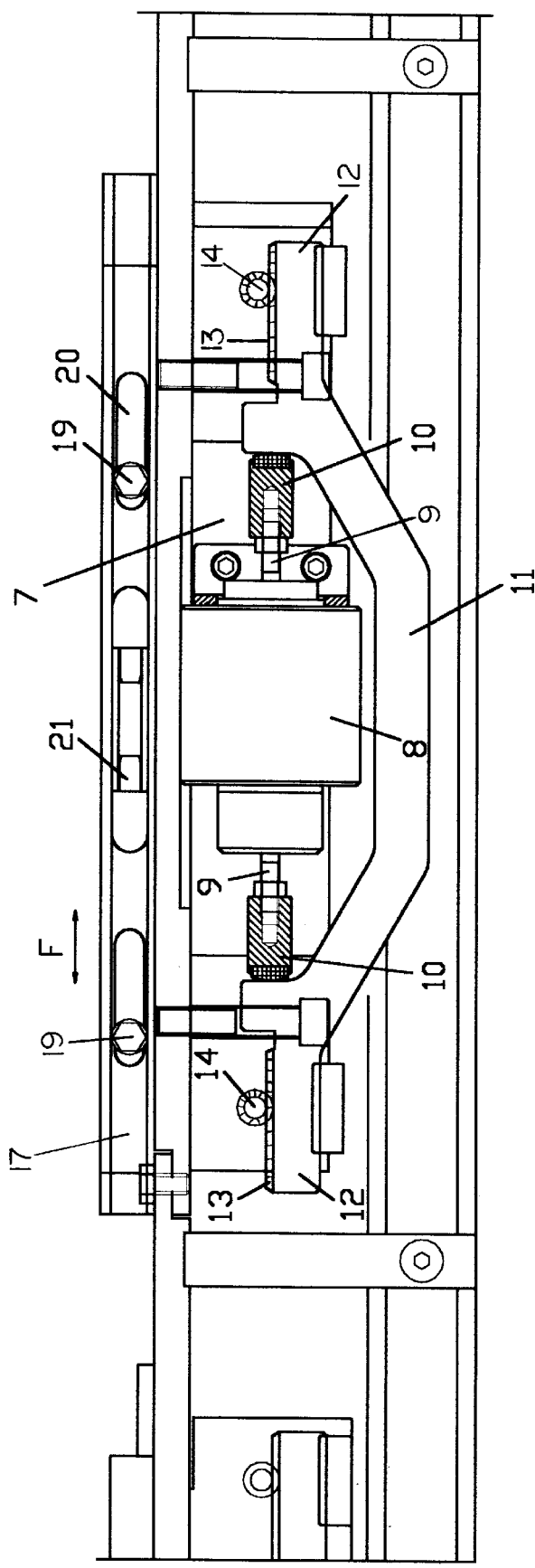
FIG. 5 is a side view of the actuating devices shown in FIG. 4.
Figure 6:
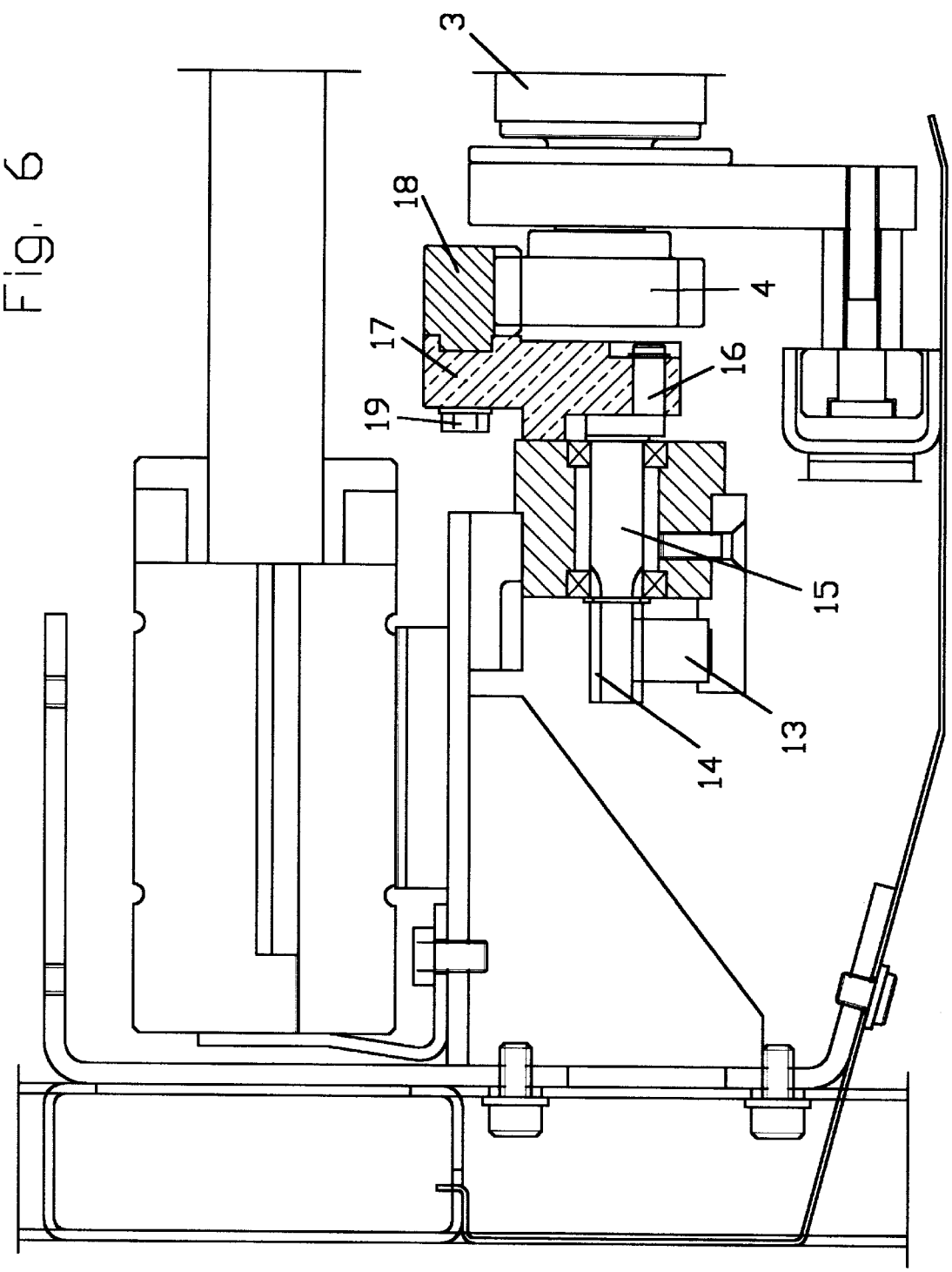
FIG. 6 shows, in a vertical section, a detail of the actuating devices shown in the FIGS. 4 and 5.

These devices are shown in FIGS. 4 to 6, which shall now be referred to.

The number 7 in the figures indicates the frame, holding an electromagnet 8 for actuating a rod 9 which acts, by an interposed pair of dampening elements 10, on a runner 11 whose ends 12 carry an equal number of racks 13.

These racks engage a pair of pinions 14, each of which is fastened to a shaft 15 provided, on the opposite side of the pinion 14, with an eccentric pin 16 (see Figure 6).

The pin commands the vertical shifts of a support 17 on which a rack 18 is mounted. When the support 17 is lowered, this rack engages the gear 4 on the trolley, thus rotating the roller 3 and the mat 2.

The rack 18 (see FIG. 5) is mounted on the support 17 not rigidly but by means of pins 19 which can move within corresponding eyelets 20, against elastic devices 21, for instance a pair of helical springs or the like.

In this manner the rack 18 may perform limited alternating motions in the direction of the arrow F, to better engage with the gears 4 actuating the mat.

The embodiment shown in the figure is equipped with a pair of wheels 4 for each trolley, a configuration particularly beneficial if the path of the machine's trolleys follows a ring arranged on an essentially vertical plane, consequently including two sections of the path running in opposite directions.

In this manner, if it is for example desirable to keep the trolley always in a backward sloping position with respect to its forward motion in order to facilitate its unloading, the trolley must be tilted to one or the other side, depending on the chosen path.

The actuation will then take place by acting on one or the other gear, depending on the path chosen and the sloping angle of the trolley.

The apparatus works as follows.

During the transport one of the rollers 6, for instance the one in the forward section of the trolley while in a forward motion, engages a rail mounted on the machine and moves the trolley to the desired sloping angle.

Whenever the trolley carrying the loaded object passes opposite the unloading area, the machine's controlling devices actuate the electromagnet 8 that slides the runner 11 with the racks 13, which in turn starts the rotation of the pinions 14 by using the shafts 15.

The shafts, in turn, cause the rotation of the eccentric pins commanding the lowering of the support 17 and rack 18, which engages the gear 4 rigidly affixed to the shaft of the mat's pulling roller 3.

The rack's capability of performing limited shifts against the elastic means 21 ensures a perfect engagement between the two rows of teeth, even in the case of a slight misalignment between them.

At this point, forward motion of the trolleys and the gear with respect to the rack induces a rotation of the roller 3 carrying the mat, which unloads the object into the underlying container.

At the end of the unloading step, it suffices to again actuate the electromagnet 8 to return the rack 18 to its raised position and thus to allow the next rollers to pass without any interference.

The system described above offers the many advantages of constructive simplicity and ease of maintenance typical of mechanical systems, combined with the ease of handling of electronically controlled systems.

An expert of the trade may then apply numerous changes and variants, all of which may however be deemed to fall within the scope of this invention.

We claim:

1. A device for actuating an unloading mat in switching machines having means capable of engaging a supporting roller for the mat, so as to control its rotation and effect the unloading of a transported object during a forward motion of a trolley holding said mat, the device comprising a rack capable of engaging a gear solidly affixed to a shaft of one of the supporting rollers, whereby the rack is mounted on a support subjected to the action of eccentric elements designed to govern the shifts from a position of rest to one of engaging with the gear; said rack being mounted on said support so as to be able to perform small shifts against elastic devices, along a direction parallel to the direction of the trolley's forward motion.

2. The device according to claim 1, wherein said rack is mounted on a support subject to the action of a pair of eccentric elements capable of simultaneously rotating said eccentric elements in the same sense, so as to govern the shifting of said supports.

3. The device according to claim 2, in which said eccentric devices comprise a runner fitted at its ends with a pair of toothed sections capable of engaging correspondingly toothed sections provided on the shafts mounting said eccentric elements.

4. The device according to claim 3, further comprising an electromagnet structured and arranged to control the shifts of said runner.

5. A system for actuating an unloading mat in switching machines in which said mat is supported by supporting rollers and is mounted on a trolley moving along a path and equipped with a gear solidly affixed to a shaft of at least one of the mat's supporting rollers, the system comprising:

a rack mounted on a support capable of moving from a position of rest to one in which the rack engages the gear;

a pair of eccentrics connected with said support and mounted on shafts provided, at their opposite ends, with a toothed section;

a runner fitted at its extremities with an equal number of toothed sections capable of engaging the toothed sections of said shafts; and means capable of governing the shifts of said runner to actuate said eccentrics and thereby the shifts of said support together with said rack.

6. The system according to claim 5, further comprising means capable of allowing some limited motions of said rack against elastic devices, in a direction parallel to the forward motion of said trolley.

* * * * *